US009958293B2

(12) United States Patent
Elliott et al.

(10) Patent No.: US 9,958,293 B2
(45) Date of Patent: May 1, 2018

(54) SENSOR WITH SHIELDING ELEMENT

(71) Applicant: KSR IP Holdings, LLC, Wilmington, DE (US)

(72) Inventors: Ryan W. Elliott, Chatham (CA); Zoe Zhu, Kitchener (CA)

(73) Assignee: KSR IP Holdings, LLC, Wilmington, DE (US)

( * ) Notice: Subject to any disclaimer, the term of this patent is extended or adjusted under 35 U.S.C. 154(b) by 171 days.

(21) Appl. No.: 14/692,791

(22) Filed: Apr. 22, 2015

(65) Prior Publication Data
US 2015/0301084 A1 Oct. 22, 2015

Related U.S. Application Data

(60) Provisional application No. 62/084,945, filed on Nov. 26, 2014, provisional application No. 61/982,659, filed on Apr. 22, 2014.

(51) Int. Cl.
*G01B 7/14* (2006.01)
*G01D 5/20* (2006.01)

(52) U.S. Cl.
CPC .............. *G01D 5/20* (2013.01); *G01D 5/204* (2013.01); *G01D 5/2046* (2013.01)

(58) Field of Classification Search
CPC ................................ G01D 5/145; G01D 5/204
USPC ........................................ 324/207.15, 207.23
See application file for complete search history.

(56) References Cited

U.S. PATENT DOCUMENTS

| 4,924,960 | A | * | 5/1990 | Crill | B60W 30/18 |
| | | | | | 180/333 |
| 7,839,136 | B1 | * | 11/2010 | John | G01R 29/0835 |
| | | | | | 324/627 |
| 2009/0251308 | A1 | * | 10/2009 | Schweitzer, III | G01R 1/22 |
| | | | | | 340/539.1 |
| 2009/0278641 | A1 | * | 11/2009 | Hedayat | F15B 15/2861 |
| | | | | | 335/284 |
| 2011/0253442 | A1 | * | 10/2011 | Lewke | H05K 9/0098 |
| | | | | | 174/377 |
| 2013/0141082 | A1 | * | 6/2013 | Zhou | G01D 5/2033 |
| | | | | | 324/207.13 |
| 2015/0070003 | A1 | * | 3/2015 | Elliott | B60T 8/368 |
| | | | | | 324/207.15 |

FOREIGN PATENT DOCUMENTS

WO WO2007133287 * 11/2007

* cited by examiner

*Primary Examiner* — Reena Aurora
(74) *Attorney, Agent, or Firm* — Dinsmore & Shohl LLP

(57) ABSTRACT

A sensor assembly is provided having a first sensor (pedal travel sensor) and a second sensor (motor position sensor). The first sensor having a first coil and a first coupler. The second sensor having a second coil and a second coupler. A shield element is positioned at least partially between the first coupler and the second coupler so as to prevent unwanted interaction between the first coil and the second coil. In one embodiment, the shield element is made of ferrite. In other embodiments, the shield element includes at least one layer of ferrite and at least one layer of aluminum, wherein the shield element include a layer of aluminum sandwiched between two layers of ferrite. More specifically, the shield element is a flux field directional material (FFDM).

23 Claims, 6 Drawing Sheets

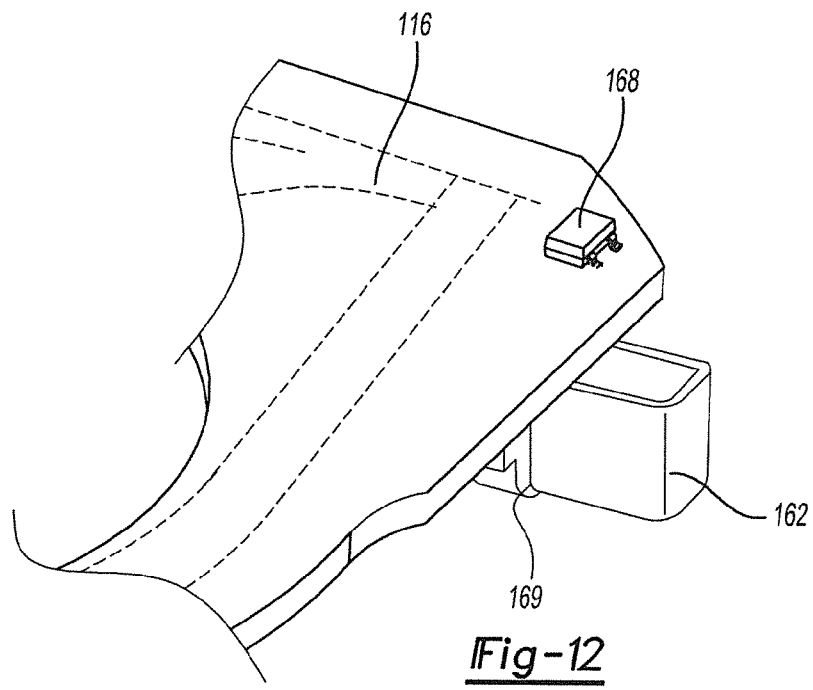
*Fig-12*
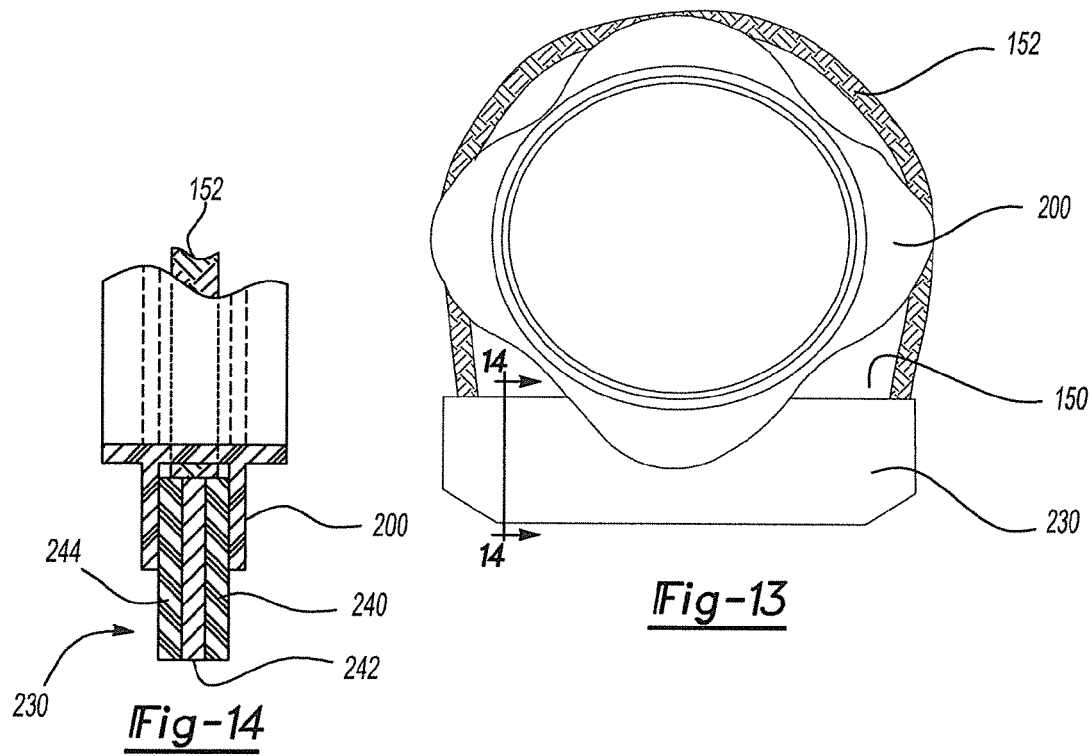
*Fig-14*
*Fig-13*

SENSOR WITH SHIELDING ELEMENT

PRIORITY

This utility patent application claims priority from U.S. provisional patent application Ser. No. 61/982,659, filed Apr. 22, 2014, and U.S. provisional patent application Ser. No. 62/084,945, filed Nov. 26, 2014, the entire contents of which are incorporated herein in their entirety.

FIELD OF THE INVENTION

The present invention related generally to sensors. More particularly, the present invention relates to a sensor having both a rotary and a linear sensor.

BACKGROUND OF THE INVENTION

Position sensors are often used in various mechanical control systems. Common position sensors include capacitive sensors, potentiometer sensors, and magnetic position sensors. However, inductive and magnetic sensors are commonly used as position sensors in vehicles. Inductive sensors detect the position of a target by measuring the mutual inductance between a target and a sensing coil. Magnetic sensors detect the position of a target by measuring the change in a magnetic field generated by a magnet in response to the movement of the target.

Sensors are commonly used in the art of pedal control to measure properties such as rotation. These sensors are typically mounted to the rotation point within a pedal assembly to measure rotation of the pedal. These sensors utilize Hall Effect, inductive technology or other known principles to measure travel and displacement. The sensor assembly includes separate sensor types such as Hall Effect or inductive. It is not known to combine a rotary sensor with a linear sensor together within an electronic braking system. Further, it would be advantageous to include multiple utilizing the benefits of each to achieve best system performance and packaging constraints imposed by the customers. However, these sensors often undesirably interact. According, there exists a need for a multiple sensor assembly which reduces said unwanted interaction.

SUMMARY OF THE INVENTION

A motor position sensor (hereinafter referred to as 'MPS') is provided. A ferrite shielding element is used to reduce the interaction between sensors packaged together. A layer of flux field direction material (3M® FFDM) (ferrite) (or KEMET) is used to reduce the interaction between sensors with an opposite set of coils. The ferrite shielding element (also referred to a 'shield element') is adapted to reduce interaction between the coupler/coils of the MPS sensor and the linear coil of the PTS sensor. In other embodiments, the shielding element include a layer of aluminum is sandwiched between two opposing layers of ferrite. Although this specific example is embodied, the ferrite shielding element may be used in any application of packaged together sensors where reducing unwanted interaction between sensors is desirable.

The present inductive sensor is a high speed inductive sensor that generates an output similar to that of a resolver but is more cost effective and has a faster response time. The present sensor is further created on a single printed circuit board (PCB) and the sensed element is a simple piece of aluminum (or other conductive metal) which has no need for winding. Alternatively, the sensed element can be a winding if required for application.

BRIEF DESCRIPTION OF THE DRAWINGS

FIG. 12 illustrates a close up perspective view of the coil having a wakeup sensor;

FIG. 13 illustrates a top view of the coil, 4-pole coupler and shielding element where the shielding element includes one layer of aluminum sandwiched between two opposing layers of ferrite; and FIG. 14 illustrates a cross sectional view of the shielding element.

DETAILED DESCRIPTION OF THE INVENTION

A sensor assembly is provided having a first sensor (pedal travel sensor) and a second sensor (motor position sensor). The first sensor having a first coil and a first coupler. The second sensor having a second coil and a second coupler. A shield element is positioned at least partially between the first coupler and the second coupler so as to prevent unwanted interaction between the first coil and the second coil. In one embodiment, the shield element is made of ferrite. In other embodiments, the shield element includes at least one layer of ferrite and at least one layer of aluminum, wherein the shield element include a layer of aluminum sandwiched between two layers of ferrite. More specifically, the ferrite of the shield element is a flux field directional material (FFDM) which allows any electromagnetic field to flow through it easier than air. The aluminum prevents the aluminum prevents the electromagnetic field from passing beyond it.

Figure 1:
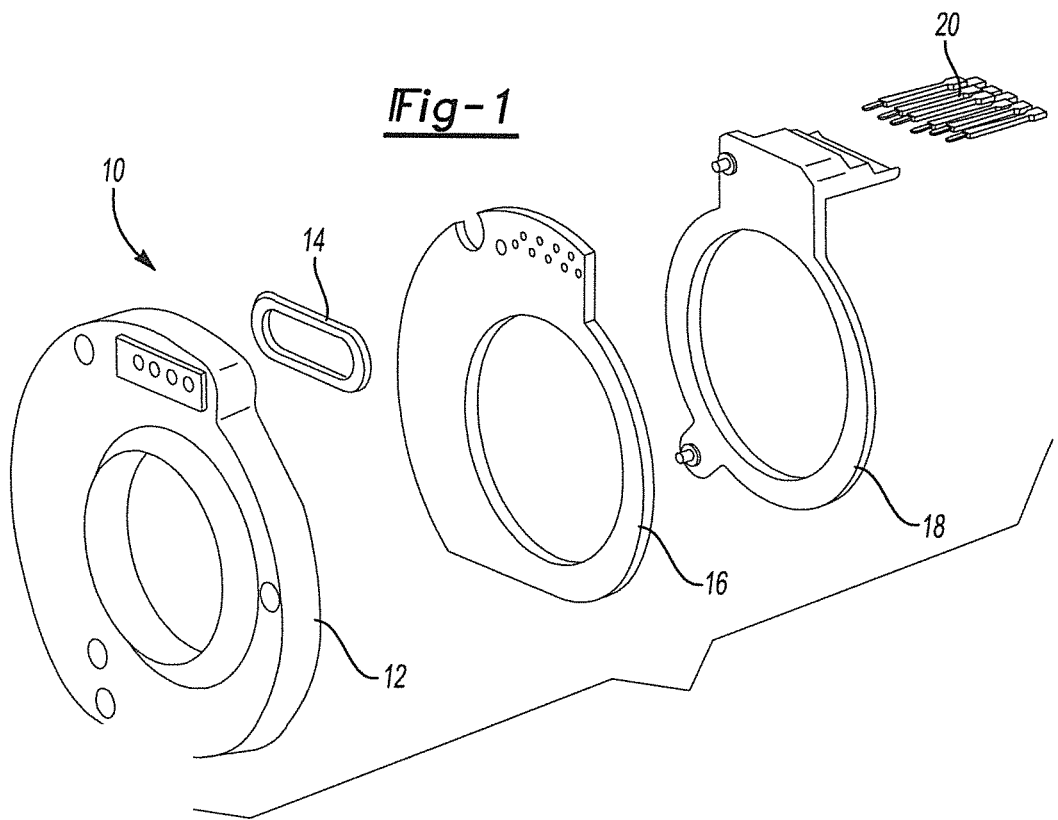
FIG. 1 illustrates a perspective exploded view of a sensor having a single coil.
Figure 2:
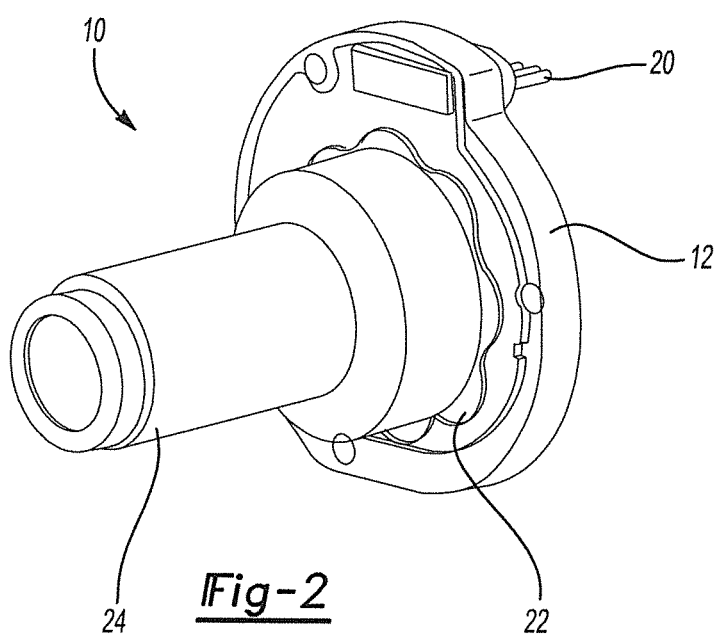
FIG. 2 illustrates a perspective view of a rotational sensor.

Embodiments of the present inductive sensor include a motor position sensor 10 (hereinafter referred to as 'MPS'). The MPS is shown in FIGS. 1-8. The MPS 10 includes an MPS housing over-mold (encapsulation) 12, an o-ring 14, a printed circuit board (hereinafter referred to as 'PCB') 16 having a passive wireless antenna (PWA) 18, a terminal over-mold, and terminal pins 20. As shown in FIG. 2, an eight-pole coupler 22 that is integral to a motor rotor 24 is positioned along an axis of the MPS 10. In this arrangement, the MPS 10 measures the rotation angle of the motor rotor.

The eight pole coupler 22 is ideally aluminum such as AL 5052-H2 or another type of aluminum with similar properties. Alternatively, steel may be used for the eight-pole coupler. In other embodiments (such as those shown in FIGS. 4, 7 and 8), a four-pole coupler is utilized.

Figure 3:
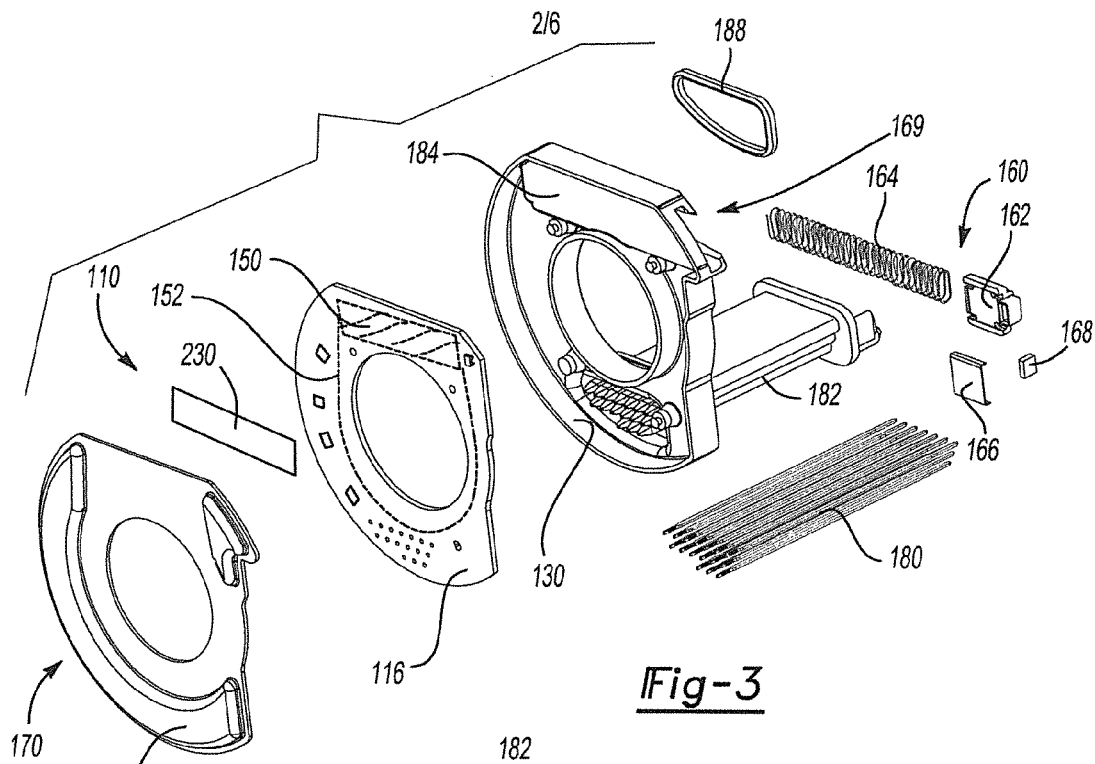
FIG. 3 illustrates an exploded perspective view of the sensor assembly having two sensors.

A sensor assembly 110 having two sensors is illustrated in FIGS. 3-8. The sensor assembly 110 includes a first (linear) sensor A PCB 116 is generally shown in FIG. 3 and includes a transmitting coil, a receiving coil, and a plurality of lumped components to perform signal processing. The PCB 116 includes a first coil 150 and a second coil 152.

The MPS is designed to be robust. For example, the MPS is immune to direct current stray magnetic field, electromagnetic noise, geometry variability, and temperature variability.

The MPS is able to function when one application-specific integrated circuit (ASIC) fails or is removed. The operating frequency increases when one tank capacitor is open and decreases when one tank capacitor is shorted. In either case, the output changes by less than a 0.15 degrees.

The output of the MPS is not changed by an axially-symmetric change in the metallic environment. An aluminum housing consumes more power due to the eddy current and a steel coupler is less efficient than an aluminum coupler.

A variation in the air gap between the MPS and the coupler has a minimal impact on the output generated by the MPS. The motor current of the motor to be measured also has a negligible effect on the output generated by the MPS.

In one embodiment, the MPS is incorporated with additional types of sensors (such as a pedal travel sensor (hereinafter referred to as a 'PTS') or any other linear sensor). FIG. 3 illustrates an MPS (second sensor) 170 incorporated with a linear PTS 160. The PTS (first sensor) 160 includes a coupler 162, a PTS return spring 164, a PST target 166 and a wake-up magnet (switch) 168. These elements are adapted to be contained within a portion of the overmold in the cavity 169 with the return spring 164 and coupler 162 further being seated within a guide and spring pocket 169 configured within an exterior linear direction of a housing 190.

The wake-up switch 168 circuit is integrated with one of the PTS 160 to "wake up" the system when the driver depresses the pedal in the electronic braking system. This switch is typically activated upon first depression of the pedal when the user first begins to operate the vehicle. The sensor module includes separate sensor types such as Hall-effect or inductive. The present invention includes both Hall-effect and inductive sensors utilizing the benefits of each to achieve best system performance.

Further, a seal or o-ring 188 is positioned between the terminal block portion 182 and the housing 190 to further seal the housing.

The present invention may include both Hall-effect and inductive sensors utilizing the benefits of each to achieve best system performance.

A plug portion is further provided to connect the sensors to an electronic control unit or other computer or processor.

Terminal block 180 is connected to the MPS 170. The terminal block 180 is a 22-pin 30 terminal block which terminates into the plug portion and is operable to connect to the vehicle electronic control unit. The terminal block 180 is encapsulated with the encapsulation material at the terminal block portion 182 of the encapsulation material. The pins are operable to connect to a female connector portion to connect directly to the electronic control unit (not shown).

The PTS 160 is provided encapsulated within the linear portion 184 of the encapsulation material 130.

The encapsulation material around the sensor assembly 110 results in a net final shape which includes the connector in addition to joining the multiple Sensors and providing sealing of the electrical components. The entire sensor assembly is encapsulated and molded to a shape with a thermoset material in a low pressure molding process. The main connector or terminal block portion of the encapsulation material is formed with a low pressure mold process. The encapsulation material prevents damage to the sensor assembly and further protects the sensor assembly from environmental conditions such as moisture, dust, and other contaminants.

A wake-up switch and ASIC producing two independent signals are mounted to a linear PCB board 116. The PCB board 116 further includes apertures 196 for receiving projecting ends of the terminal block pins 180 as well as mounting an arrangement of ASIC chips, at 194 This assembly together with a female connector for the ECU is placed in a mold and over molded with a thermoset encapsulation material. The encapsulation material forms a housing which has two ears which extend outwardly for receiving bushings for receiving fasteners which secure the linear module to the integrated brake control unit.

Both the MPS 170 and the PTS 160 are electrically connected to the integrated brake control unit via the connectors and mounted to the unit by fasteners. The modules work as before to provide fully enclosed sensor units. The sensors, as the same as above, send signals to the brake control unit or other ECU.

Linear sensor assemblies as described above are used to detect the axial displacement of an input rod. The axial displacement may be used for processing a return function. For instance, it is known to use linear sensors in brake pedal applications. The input rod is operatively connected to the brake pedal, and the linear sensor measures the linear displacement of the input rod. The linear displacement is then processed by the vehicle to generate a corresponding brake function The linear sensor assemblies of the present invention are configured to detect the linear displacement of an input rod. The linear assembly provides for a fixed relationship between the input rod and a sensor target, wherein the fixed relationship between the sensor target and input rod is provided without the use of conventional spring followers so as to reduce the packaging dimensions of the assembly, reduce the noise associated with the operation of a spring, and increase positional tolerance as any available position of the input rod may be utilized as opposed to a fixed position with respect to traditional spring followers.

For illustrative purposes, the linear sensor is provided to be connected to an input rod of a brake assembly. The input rod may include a radial flange disposed on a proximal end of the input rod. The linear sensor includes a coupler and a push rod assembly. The coupler connected to the push rod assembly and moves adjacent to the second coil 150

In all embodiments discussed above, the sensors are in communication with an ECU or other electronic pedal control system to provide information to the pedal system. Since this is an electronic system, information needs to be conveyed to the system to tell the system when to brake or accelerate.

In one embodiment, the PTS is a Hall-effect sensor, the linear sensor further includes a printed circuit board wherein a hall effect chip operable to measure linear distance traveled is mounted to the printed circuit board and is in communication with a magnet of the linear sensor. Further, the rotary sensor utilizes the same printed circuit board as the linear sensor, the printed circuit board also including an inductive sensor. In other embodiments, the PTS is an inductive sensor.

A wake up switch circuit may be integrated with at least one of the linear sensors to wake up the system when the driver depresses the pedal in the electronic pedal system.

The MPS and the PTS may each have their own distinct printed circuit boards. In one embodiment, the rotary sensor is an inductive sensor. In one embodiment, the linear sensor connects to the pedal by means of a magnet.

Figure 4:
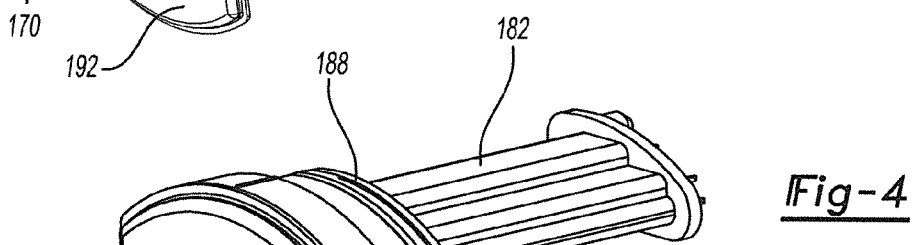
FIG. 4 illustrates a perspective view of the sensor assembly having two sensors.
Figure 5:
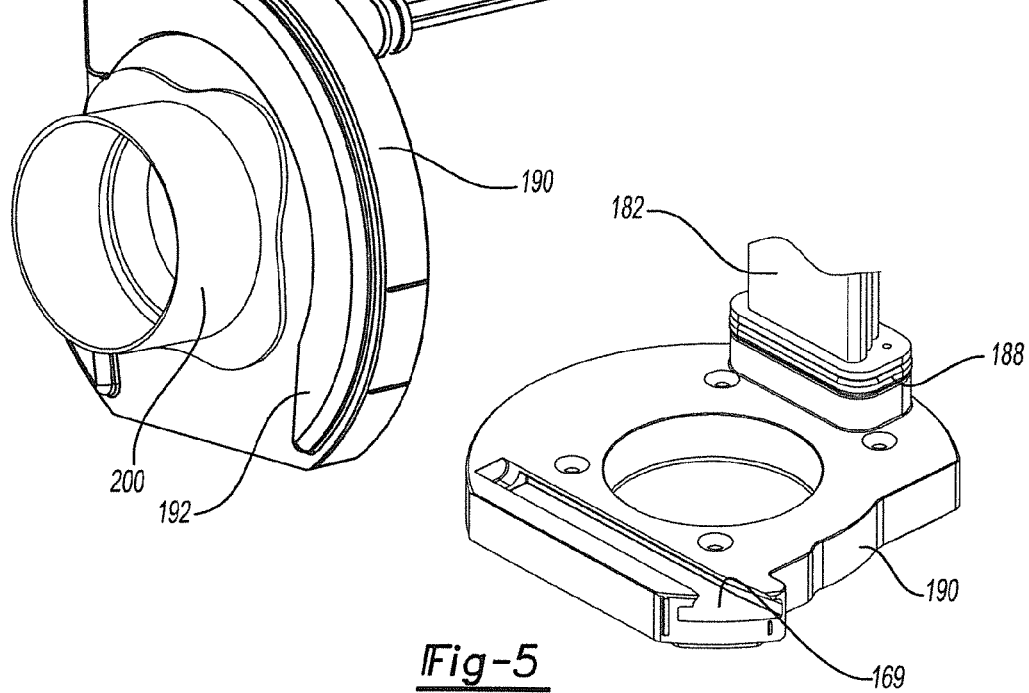
FIG. 5 illustrates an underside perspective view of a portion of the linear sensor assembly.
Figure 6:
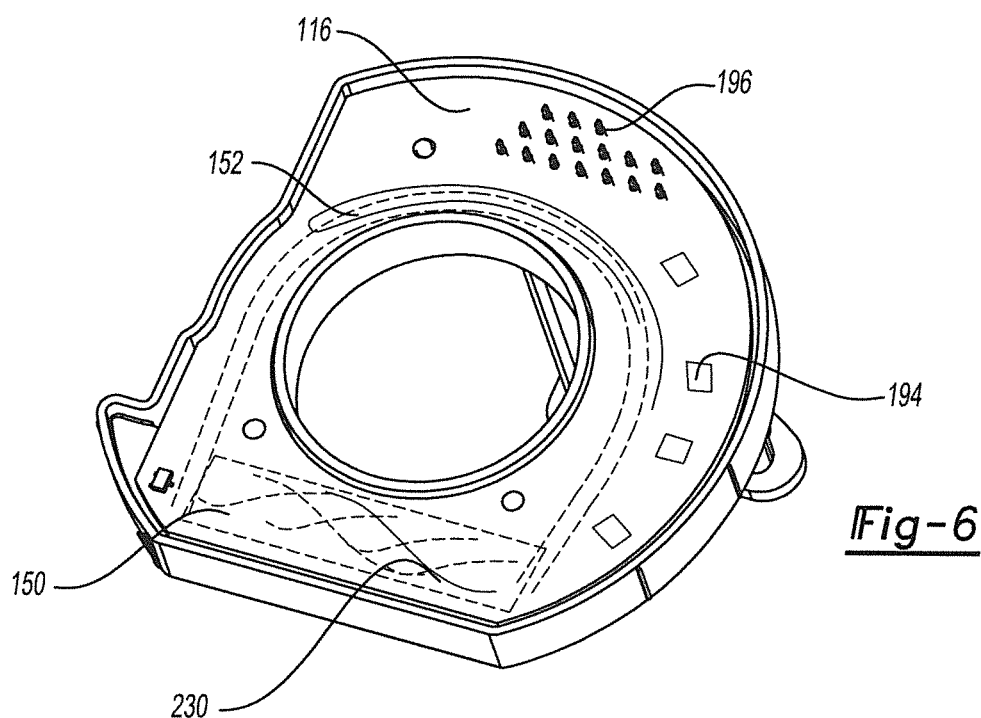
FIG. 6 illustrates a perspective view of the installed coil and shielding element.
Figure 7:
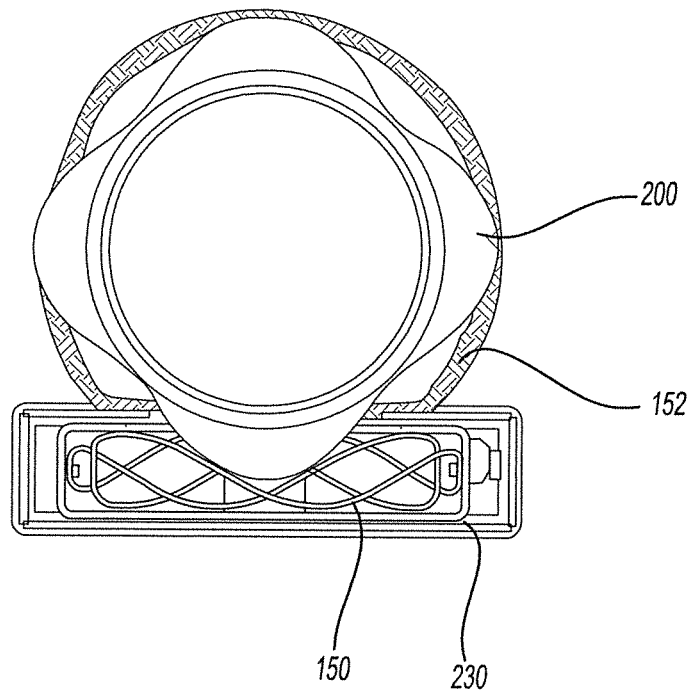
FIG. 7 illustrates a top view of the 4-pole coupler, coil and shielding element in a first position.
Figure 8:
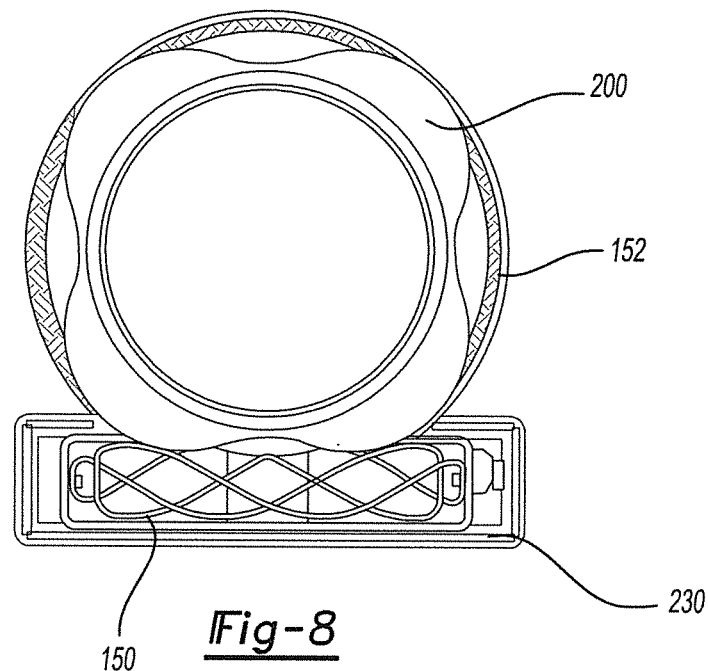
FIG. 8 illustrates a top view of the 4-pole coupler, coil and shielding element in a second position.

The MPS 170 further includes an overmold housing 130 to which is secured such as a cover 192 (FIG. 3) a 4-pole coupler 200, such as shown in FIG. 4, further being secured to the cover 192. The 4-pole coupler is adapted to communicate with the second coil 152 on the PCB 116.

A wake up switch may be provided connected to the at least one linear sensor to wake up the system when the driver depresses the pedal. A spring 164 is provided to push back to the pedal assembly during depression of the pedal and movement of the magnet.

A sensor assembly having a first sensor and a second sensor is provided. The first sensor having a first coil and a first coupler. The second sensor having a second coil and a second coupler. A shield element is positioned at least partially between the first coupler and the second coupler so as to prevent unwanted interaction between the first coil and the second coil. In one embodiment, the shield element is made of ferrite. In other embodiments, the shield element includes at least one layer of ferrite and at least one layer of aluminum, wherein the shield element includes a layer of aluminum sandwiched between two layers of ferrite. More specifically, the shield element is a flux field directional material (FFDM). In other embodiments, there is just one layer of ferrite and one layer of aluminum.

The first coil 152 and the second coil 150 are on the same plane. The first coil and the second coil are connected to the same printed circuit board (PCB). The shield element is connected to the PCB. In one embodiment, the shield element is connected to the PCB by means of an adhesive. In other embodiments, the shield element is connected to the PCB by means of a fastener.

In one embodiment, first coil and the second coil are interconnected. The first sensor is a linear sensor adapted to measure pedal travel. The second sensor is a rotary sensor adapted to measure motor rotation. In one embodiment, at least a portion of the sensor assembly in encapsulated.

In one embodiment, the first sensor is a motor position sensor where the first coupler being a rotatable 4-pole coupler. Further, in some embodiments, the second sensor is a pedal position sensor. The sensor assembly may include a wake up switch, the wake up switch using Hall-effect. Further, in some embodiments, the shield element fully covers the second coil.

The housing may be overmolded over both the at least one linear sensor and the rotary sensor. The at least one linear sensor and the at least one rotary sensor may be encapsulated within the housing. The at least one linear sensor may be a Hall-effect sensor. A wake up switch circuit may be integrated with at least one of the linear sensors to wake up the system when the driver depresses the pedal in the electronic pedal system. The rotary sensor is an inductive sensor. The linear sensor may include at least one magnet operable to measure travel of push rod connected to a pedal. The magnets (or Hall Effect chips) are may be mounted to a PCB. The linear sensor may connect to the pedal by means of a magnet. A wake up switch may be provided connected to the at least one linear sensor to wake up the system when the driver depresses the pedal.

In one embodiment, a ferrite shielding element 230 is used to reduce the interaction of the coupler with the coils. Specifically, a layer of flux field direction material (3M® FFDM) is used to reduce the interaction of the MPS-PTS Couplers with the opposite set of coils. The ferrite shielding element 230 is adapted to reduce interaction between the coupler 200 and corresponding second coil 152 (MPS sensor) with the first coil 150 (and coupler 162) (PTS sensor).

In furtherance to the above embodiments, the coil 150 is adapted to measure linear travel of a pedal whereas the coupler 200 and corresponding second coil 152 (MPS sensor) is adapted to measure rotary motion of a DC motor. In this specific embodiment, the two sensors (MPS and PTS) do interact to improve performance, specifically the coils are physically connected. The physical connection allows the coils to communicate.

The shielding element 230 is adapted to prevent to portion of the interaction that is unwanted (i.e. unwanted radiation). With this interaction modifying the nominal frequency of each sensor to maximize performance and minimize interactive effects while not violating radiation emission standards is utilized. The shielding element 230 is adapted to reduce the unwanted interaction while still allowing for the desired interaction between the physical connections between the coils of multiple sensors. The material of the shielding element 230 of the present embodiment is Ferrite. Specifically, 3M® FFDM material which is a plastic with powder in it. The ferrite/3M® FFDM is a high permeability material at the nominal operating frequency of the sensors.

In the present embodiment, the shielding element 230 is connected to the PCB 116 by means of an adhesive. Alternatively, the shielding element 230 is connected to the PCB and positioned over the coils by means of a fastener, bolt, screw or other similar mechanical attachment. Further, in the present embodiment, the shielding element 230 is connected to the coil and positioned to fully cover the coil. However, in other embodiments the shielding element 230 may be slightly spaced apart from the coil and/or only partially covering the coil.

The shielding element 230 is made of ferrite. Ferrite is particularly advantageous since it is a high permeability material at the nominal operating frequency of the sensors. Further, in this embodiment, ferrite is particularly advantageous passed on its performance. Ferrite functions essentially as an effective equivalent air gap (permeability×thickness) which results in the results of interaction between the sensors. Other materials having a similar effective equivalent air gap (permeability×thickness) may also be used.

Furthermore, the use of the shielding element 230, in the present positioning or otherwise, allows for use of two inductive sensors. Further, the shielding element 230 also allows for use of one inductive sensor near another sensor (connected to or spaced apart from) with moving metal. Furthermore, the shielding element 230 will also provide for multiple sensors to be packaged closely together thus saving both cost and space within a vehicle. Without the shielding element 230, an interactive nature between multiple sensors would result and cross talking that negatively affects performance and thus forces the sensors being packaged further apart. In highly integrated systems, the sensors must be packaged close together. Accordingly, without the shielding element 230, highly integrated systems requiring multiple sensors have significant unwanted interaction and cross talk.

The present invention provides for encapsulation of the entire sensor assembly to assist in packaging (to have the sensor assembly all contained together). The configuration also allows for the entire sensor assembly to be fully encapsulated by the encapsulation material. The encapsulation material assist in protecting the sensors for damage, dust, water . . . etc. and other environmental factors. The encapsulation material may also reduce noise. The sensor assembly fully assembled with the encapsulation material provides for a finished package ready for assembly provided to the customer and/or manufacturer.

The material will be a thermoset that is either polyester or epoxy based. The advantages are that the entire product including connector and any inserts including the tubes can be molded in one shot which gives a final product. Also the entire sensor assembly will be completely sealed and electronics covered.

The shielding element 230 may be used in any of the embodiments as shown in the Figures to reduce interaction between sensors.

Figure 9:
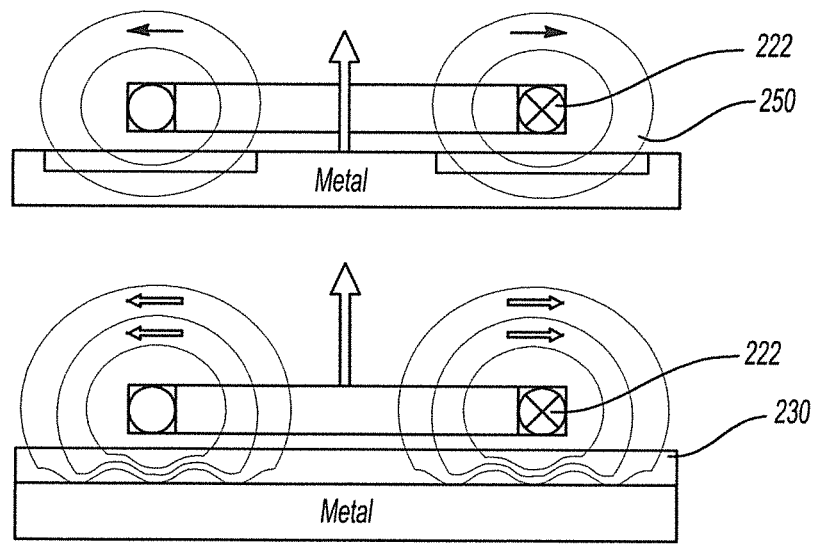
FIG. 9 illustrates the flow of the magnetic flux with and without the shielding element.
Figure 10:
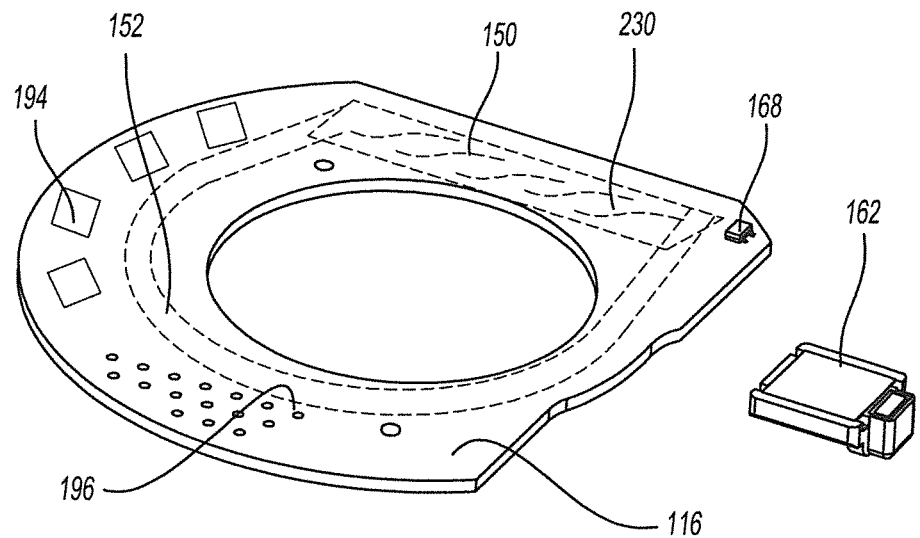
FIG. 10 illustrates the PCB with two coils and a corresponding linear coupler.
Figure 11:
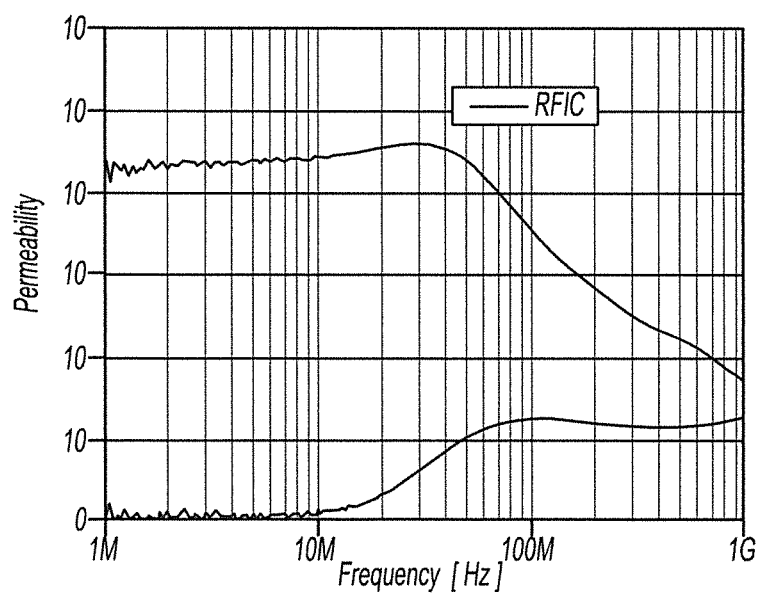
FIG. 11 illustrates a graph illustrating frequency v. permeability with and without the shielding element.

FIG. 9 illustrates the sensor assembly with and without the shielding element 230. As illustrated, the magnetic flux 250 is interrupted when the shielding element 230 is used preventing unwanted interaction (radiation) with the opposing sensor. The antenna tag 222 is disposed as the center of the magnetic flux 250.

The aluminum layer 242 provide comprehensive isolation by acting as an eddy plate to any field that tries to cross the barrier. The ferrite 240, 244 acts as before by providing a higher effective air gap by being a lower "impedance" path for the electromagnetic field." The aluminum acts as an eddy plate canceling any fields that try to pass through, however the ferrite layers 240, 244 on either side eliminates the loading and loss of nominal signal that would otherwise be happen with just an eddy barrier.

The sandwich structure (such as shown in FIG. 13) allows it to be fully blocking without any negative effects. Alternatively, there could be simple one layer of ferrite and one layer of aluminum (or any similar configuration thereof).

In other embodiments, the shield element includes at least one layer of ferrite and at least one layer of aluminum, wherein the shield element includes a layer of aluminum sandwiched between two layers of ferrite. More specifically, the shield element is a flux field directional material (FFDM).

In one embodiment, the first sensor is one of an inductive sensor or a Hall-effect sensor, the second sensor being the other of an inductive sensor or a Hall-effect sensor. This is possible due to the fact that the sensors do not interact because of their technology differences.

Furthermore, in another embodiment, the first sensor and the second sensor operate at different frequencies. This eliminates the possibility of beating and also reduces the possibility of interaction problems. Structurally the sensor assembly would remain the same, but the coils of the sensors would operate at difference frequencies.

In other embodiments, a first sensor having a first coil and a first coupler, the first sensor operating at a first frequency. A second sensor having a second coil and a second coupler, the second sensor operating at a second frequency where the first frequency being different than the second frequency so as to prevent unwanted interaction between the first sensor and the second sensor.

More specifically, in other embodiments, a sensor assembly includes a motor position sensor operating at a first frequency, a pedal travel sensor operating at a second frequency, the pedal travel sensor connected to the motor position sensor wherein the first frequency being different than the second frequency so as to prevent unwanted interaction between the first sensor and the second sensor. In one embodiment, the first frequency is at least 1 MHz greater than the second frequency. In other embodiments, the first frequency is between 0.5-3 MHz greater than the second frequency. The operation and different frequencies reduces the unwanted communication between the coils of the sensors. In one embodiment, the PTS operates at approximately 3.3 MHz and the MPS operates at approximately 4.3 Mhz.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A sensor assembly comprising: a first rotary position sensor measuring a motor rotation having a first coil and a first coupler;
   a second linear position sensor measuring a pedal travel having a second coil and a second coupler;
   wherein the first coil and the second coil are on the same plane and wherein the first coil and the second coil are connected to the same printed circuit board (PCB);
   a shield element positioned at least partially between the first coupler and the second coupler so as to prevent unwanted interaction between the first sensor and the second sensor; and
   wherein the shield element is connected to the PCB.

2. The sensor assembly of claim 1 wherein the shield element is made of ferrite.

3. The sensor assembly of claim 1 wherein the shield element includes at least one layer of ferrite and at least one layer of aluminum.

4. The sensor assembly of claim 3 wherein the shield element include a layer of aluminum sandwiched between two layers of ferrite.

5. The sensor assembly of claim 1 wherein the shield element is a flux field directional material (FFDM).

6. The sensor assembly of claim 1 wherein the shield element is connected to the PCB by means of an adhesive.

7. The sensor assembly of claim 1 wherein the shield element is connected to the PCB by means of a fastener.

8. The sensor assembly of claim 1 wherein the first coil and the second coil are interconnected.

9. The sensor assembly of claim 1 wherein the sensor assembly in encapsulated.

10. The sensor assembly of claim 1 wherein the first sensor is a motor position sensor, the first coupler being a rotatable 4-pole coupler.

11. The sensor assembly of claim 1 wherein the second sensor is a pedal position sensor.

12. The sensor assembly of claim 1 wherein the sensor assembly includes a wake up switch, the wake up switch using Hall-effect.

13. The sensor assembly of claim 1 wherein the shield element fully covers the second coil.

14. The sensor assembly of claim 1 wherein the first sensor is one of an inductive sensor or a Hall-effect sensor, the second sensor being the other of an inductive sensor or a Hall-effect sensor.

15. The sensor assembly of claim 1, comprising:
a housing having a rotary sensor including a least one coil; and
a linear position sensor mounted within said housing.

16. The assembly as described in claim 15, further comprising a PCB board mounted within said housing incorporating said coils in addition to components for performing signal processing.

17. The assembly as described in claim 15, said housing including an annular shaped portion, an elongated terminal block portion extending from said annular shaped portion and containing a plurality of pins communicating with a vehicle Electronic Control Unit.

18. The assembly as described in claim 17, said housing further comprising an annular shaped portion having an annular open interior receiving said rotary coupler.

19. The assembly as described in claim 18, further comprising a terminal block portion extending from said annular shaped portion and enclosing said terminal block.

20. The assembly as described in claim 15, further comprising a wake up switch integrated into said housing in proximity to said linear coupler.

21. The assembly as described in claim 15, said rotary sensor further comprising a motor position sensor and said linear position sensor further comprising a pedal travel sensor.

22. The assembly as described in claim 15, further comprising a spring biasing said linear coupler, said spring and coupler being seated within a guide and spring pocket configured within an exterior linear direction of said housing.

23. An assembly combining each of a rotary position
Sensor measuring a motor rotation and a linear position sensor measuring a pedal travel, said assembly comprising:
a housing rotatably supporting a rotor having a circumferentially extending and multiple pole coupler forming a portion of the rotary position sensor and having a coil;
a PCB mounted within said housing and including exciting and receiving cons in addition to components for performing signal processing;
the linear position sensor including a coil and a linear travel coupler mounted to said housing; and
a shielding element connected to the PCB positioned between said cons to reduce interaction between said multi pole rotary coupler and said linear travel coupler.

* * * * *